US007626989B2

(12) United States Patent
Raitola et al.

(10) Patent No.: US 7,626,989 B2
(45) Date of Patent: Dec. 1, 2009

(54) CAPACITY ALLOCATION FOR PACKET DATA BEARERS

(75) Inventors: Mika Raitola, Masala (FI); Tero Kola, Helsinki (FI); Mika Kolehmainen, Helsinki (FI)

(73) Assignee: Nokia Corporation, Espoo (FI)

( * ) Notice: Subject to any disclaimer, the term of this patent is extended or adjusted under 35 U.S.C. 154(b) by 1147 days.

(21) Appl. No.: 10/204,196

(22) PCT Filed: Feb. 6, 2001

(86) PCT No.: PCT/EP01/01216

§ 371 (c)(1),
(2), (4) Date: Jan. 15, 2003

(87) PCT Pub. No.: WO01/63851

PCT Pub. Date: Aug. 30, 2001

(65) Prior Publication Data

US 2005/0276256 A1 Dec. 15, 2005

(30) Foreign Application Priority Data

Feb. 21, 2000 (GB) .............................. 0004088.1

(51) Int. Cl.
*H04L 12/56* (2006.01)

(52) U.S. Cl. .............................. 370/395.41; 370/395.42

(58) Field of Classification Search ................. 370/348, 370/425, 310, 395.4, 395.41, 395.43, 335, 370/342, 441, 479, 329, 395.42

See application file for complete search history.

(56) References Cited

U.S. PATENT DOCUMENTS 3,560,660 A * 2/1971 Poretti et al. ................. 370/294
4,189,622 A * 2/1980 Foshee ........................ 375/373

(Continued)

FOREIGN PATENT DOCUMENTS

EP       0884864 A1 * 6/1998

(Continued)

OTHER PUBLICATIONS

Efficient distributed scheduling architecture for wireless ATMnetworks; Tse, C.H. Bensaou, B. Chua, K.C.; Center for Wireless Commun., Nat. Univ. of Singapore; This paper appears in: ATM Workshop, 1999. IEEE Proceedings; Publication Date: 1999 On pp. 415-425; Meeting Date: May 24, 1999-May 27, 1999; Location: Kochi, Japan.*

(Continued)

*Primary Examiner*—Ayaz R Sheikh
*Assistant Examiner*—Salman Ahmed
(74) *Attorney, Agent, or Firm*—Alfred A. Fressola; Ware, Fressola, Van Der Sluys & Adolphson LLP

(57) ABSTRACT

The present invention relates to a method in a radio communication system providing packet data services. A radio communication system providing packet data services and a packet data scheduler (PS) are also disclosed. In accordance with the method capacity is requested for a packet data bearer, whereafter capacity is allocated for the packet data bearer based on a first timing scheme. The allocated capacity may be modified based on a second timing scheme. The packet data scheduler (PS) comprises two timers (T1, T2) fore implementing the two different timing schemes.

25 Claims, 7 Drawing Sheets

U.S. PATENT DOCUMENTS

| | | | | |
|---|---|---|---|---|
| 4,418,386 | A | * | 11/1983 | Vrielink ...................... 713/501 |
| 5,914,950 | A | * | 6/1999 | Tiedemann et al. ......... 370/348 |
| 5,953,665 | A | * | 9/1999 | Mattila ....................... 455/434 |
| 6,034,960 | A | * | 3/2000 | Beshai et al. ............ 370/395.4 |
| 6,108,553 | A | * | 8/2000 | Silventoinen et al. .... 455/456.3 |
| 6,118,787 | A | * | 9/2000 | Kalkunte et al. ............ 370/445 |
| 6,141,336 | A | * | 10/2000 | Bauchot et al. ............. 370/348 |
| 6,201,966 | B1 | * | 3/2001 | Rinne et al. ................. 455/434 |
| 6,404,771 | B1 | * | 6/2002 | Gulick ........................ 370/442 |
| 6,438,134 | B1 | * | 8/2002 | Chow et al. ................. 370/412 |
| 6,469,996 | B1 | * | 10/2002 | Dupuy ........................ 370/337 |
| 6,470,016 | B1 | * | 10/2002 | Kalkunte et al. ........ 370/395.41 |
| 6,628,738 | B1 | * | 9/2003 | Peeters et al. ............... 375/371 |
| 6,665,301 | B1 | * | 12/2003 | Wu ........................ 370/395.41 |
| 6,693,892 | B1 | * | 2/2004 | Rinne et al. ................. 370/348 |
| 6,718,179 | B1 | * | 4/2004 | Forssell et al. .............. 455/509 |
| 6,731,638 | B1 | * | 5/2004 | Ofek ........................ 370/395.4 |
| 6,791,944 | B1 | * | 9/2004 | Demetrescu et al. ........ 370/235 |
| 6,901,066 | B1 | * | 5/2005 | Helgeson .................... 370/348 |
| 6,920,128 | B1 | * | 7/2005 | Haugli et al. ............... 370/348 |
| 6,975,613 | B1 | * | 12/2005 | Johansson ................... 370/338 |
| RE39,216 | E | * | 8/2006 | Worsley et al. ......... 370/395.53 |
| 7,483,433 | B2 | * | 1/2009 | Simmons et al. ....... 370/395.31 |
| 2004/0210705 | A1 | * | 10/2004 | Armstrong et al. .......... 711/100 |
| 2005/0276256 | A1 | * | 12/2005 | Raitola et al. ............... 370/349 |

FOREIGN PATENT DOCUMENTS

| | | | |
|---|---|---|---|
| WO | | 9907170 | 2/1999 |
| WO | | 9948255 | 9/1999 |
| WO | WO0163851 | A1 * | 8/2001 |
| WO | WO03036881 | * | 5/2003 |

OTHER PUBLICATIONS

Throughput analysis of a timer controlled token passing protocol under heavy load; Pang, J.W.M.; Tobagi, F.A.; Communications, IEEE Transactions on vol. 37, Issue 7, Jul. 1989 pp. 694-702.*

Scalable timers for soft state protocols; Sharma, P.; Estrin, D.; Floyd, S.; Jacobson, V.; Infocom '97. Sixteenth Annual Joint Conference of the IEEE Computer and Communications Societies. Proceedings IEEE; vol. 1, Apr. 7-11, 1997 pp. 222-229 vol. 1.*

Staged refresh timers for RSVP; Ping Pan; Schulzrinne, H.; Global Telecommunications Conference, 1997. Globecom '97., IEEE; vol. 3, Nov. 3-8, 1997 pp. 1909-1913 vol. 3.*

* cited by examiner

CAPACITY ALLOCATION FOR PACKET DATA BEARERS

CROSS REFERENCE TO RELATED APPLICATIONS

This application is the U.S. national stage of International Application No. PCT/EP01/01216 filed on Feb. 6, 2001, which was published in English on Aug. 30, 2001 under International Publication Number WO 01/63851, and which in turn claims priority under 35 USC §119(e) to Great Britain Patent Application No. 0004088.1 filed on Feb. 21, 2000.

FIELD OF THE INVENTION

The present invention relates packet data services in a radio telecommunications system.

BACKGROUND OF THE INVENTION

A telecommunications system may comprise a radio network. A radio telecommunication network typically operates in accordance with a given standard (or several standards) which sets out what the elements of the network are permitted to do and how that should be achieved. A typical radio telecommunications network consists of a number of cells, and is thus often referred to as a cellular radio network. A cell is typically formed by a certain area covered by one or several base transceiver stations (BTS) serving mobile stations (MS; sometimes also referred to as user equipment UE) within the cell via a radio interface. Each base-station has a radio transceiver capable of transmitting radio signals in downlink to the mobile stations within the cell area and receiving radio signals in uplink from the cell area next to the base-station. By means of these signals, the base station can communicate with the mobile station (MS) in that cell, which itself includes a radio transceiver.

Each base station may be connected to a base station controller (BSC) or to any other controller functionality provided by the cellular network. Thus a mobile station (MS) within a cell of the system is continuously controlled by a node providing controller function. Examples of the network controller include said base station controller (BSC), a radio network controller (RNC) and a mobile switching center (MSC), but other control nodes may also be used for the implementation of the network control functionality. The controller can be linked further to the public telephone network and/or to other networks such as packet data networks. By means of this system a user of the MS can establish a connection to the public network via one or several base stations.

The location of the mobile station MS could be fixed (for example if it is providing radio communications for a fixed site) or the MS could be moveable (for example if it is a hand portable transceiver or "mobile phone"). When the mobile station is moveable it may move between cells of the cellular radio system. As it moves from one cell (the "old cell") to another cell (the "new cell") there is a need to hand it over from communication with the BS of the old cell to the BS of the new cell without dropping the call.

In addition to circuit switched services, radio communication systems may also provide packet data services for the users thereof. The packet data service is typically a connectionless service where information symbols are transmitted within data packets. The size and length of the data packets may vary. The information symbols are typically carried by means of packet data bearers. The transmission speed of a bearer is defined by a parameter referred to as bitrate. More particularly, bitrate defines the bit rate that has been allocated for a user of the packet data services. For example, in the WCDMA (Wideband Code Division Multiple Access) based systems bitrate values such as 16, 32, 64, 128, 256 and 384 kbits may be used.

Packet data traffic may include various kinds of data transmission, such as short messages or text only emails and transmission of large documents in the background and interactive browsing of the world wide web (WWW). To give an example about packet data traffic, an ETSI (European Telecommunications Standards Institute) packet data model is shortly described here. A packet service session may contain one or several packet calls depending on the application. The packet data call may also be based on a non-real time (NRT) packet data service. During a packet call several packets may be generated, which means that the packet call constitutes typically a bursty sequence of packets. To give an example, in a web browsing session a packet call corresponds to the downloading of a document. After the document is entirely received by the user terminal, the user may consume some time for studying the information he has just received before he takes some further actions, such as request more data. Thus the traffic may be very bursty and the amount of traffic may be difficult to predict.

The non-real time (NRT) packet services via an air interface are different from real time (RT) services (i.e. circuit switched services) via an air interface. Firstly, as mentioned, the packet data is bursty. The required bit rate can change rapidly from zero to hundreds of kilobits per second. Packet data tolerates longer delay times than real time services. Therefore the packet data traffic may be more readily controlled from the radio access network point of view. Fore example, in interactive services the user must get resources within a reasonable time, but in a background type services the data can be transmitted when the free radio interface capacity can be allocated for the transmission. Data packets can also be retransmitted by a radio link control (RLC) layer. This allows the usage of a worse radio link quality and much higher frame-error-ratio than what could be used for real-time services.

In addition to non-real time services, it is also possible to transmit real time services, for example service classes such as telephone conversations and streaming data transmission, over packet networks. An example of the real time packet data traffic is transmission of voice over IP (Internet Protocol), i.e. so called Internet calls.

Packet scheduling function is employed to fill the any 'empty' capacity the packet data bearers may have. The empty capacity means potential capacity not currently used e.g. by circuit switched data, speech or signalling traffic. In other words, the packet scheduling tries to find any potential remaining network capacity for the packet data. More particularly, the function of the packet scheduling is to allocate, modify and release bitrates for the packet data service users in a dedicated transport channels (DCH) based on specific predefined parameters.

The scheduling may, however, not always be a straightforward operation to accomplish, for example because the load in the network changes dynamically. Also, packet data bearers in the DCH may have different bitrates and duration. The length of calls may also vary significantly and unpredictably, i.e. the cell load may be very bursty. If there are too few DCH allocations for the packet data bearers at the same time or if the allocated bit rates are too slow the available capacity may not be well and/or efficiently used. On the other hand, if there are too many DCH allocations for the packet data bearers or if the allocated bitrates are packet data bearers that have relatively high bitrates, the network may become overloaded.

A bitrate has to be allocated every time a new radio link is established between a mobile station and a base station. Because a controller, such as the radio network controller RNC, may handle a substantial number of radio links, a bitrate allocation may occur fairly often. This requires a substantial capacity from the controller. Once a bitrate has been allocated for a bearer, the bearer will have the allocated bitrate for either a limited or unlimited period of time, depending the application. However, the load conditions may change. This change may also be rapid and/or unpredictable. In addition, as there may exist several packet data bearers at the same time, the priority order between these may change. Therefore, what is needed is a flexible and preferably a dynamic solution for packet data scheduling.

SUMMARY OF THE INVENTION

It is an aim of the embodiments of the present invention to address one or several of the above problems.

According to one aspect of the present invention, there is provided a method in a radio communication system providing packet data services, comprising:
  request capacity for a packet data bearer;
  allocating capacity for the packet data bearer based on a first timing scheme; and
  modifying the allocated capacity based on a second timing scheme.

In the more specific embodiments, the steps of allocation of the capacity for the packet data bearer and modifying of the allocated capacity may be repeated periodically in accordance with the respective timing schemes. The lengths of the time periods may be of different lengths. The capacity allocation and/or capacity modification may be based on load information from a base station and/or mobile station of the radio communication system. The capacity allocation and/or capacity modification may be based on at least one target value for the power levels experienced by a base station of the radio communication system.

In accordance with an embodiment, a decision may be made whether all that capacity that was requested is allocated, a smaller amount of capacity than what was requested is allocated or no capacity is allocated.

In addition, a bitrate modification function may be used for calculating a bitrate value for a data packet bearer after one or more new capacity requests are received. The calculations may be based on one or several of the following: the requested bitrate; the bitrate used by the packet data bearer; a proposed bitrate; average power used by a packet data bearer; soft handover correction factor; priority order of the packet data bearers; and a weighting coefficient. An estimate may be computed for a packet data bearer concerning the new load that would be caused if the bitrate of the packet data bearer is changed by a proposed amount. The estimate may be calculated for all packet data bearers, and the packet data bearer whose bitrate is to be changed, if any, is selected by comparing the calculated estimates.

According to another aspect of the present invention there is provided a radio communication system providing packet data services, comprising:
  a packet data scheduler, said scheduler being arranged to allocate capacity for packet data bearers and to modify the allocated capacity;
  a first timer for timing the allocation of capacity for the packet data bearers; and
  a second timer for timing the modification of the allocated capacity.

According to another aspect of the present invention there is provided a packet data scheduler for a radio communication system, said scheduler being arranged to allocate capacity for packet data bearers and to modify the allocated capacity, the packet data scheduler comprising:
  a first timer for timing the allocation of capacity for the packet data bearers; and
  a second timer for timing the modification of the allocated capacity.

The packet data scheduler may be arranged to accomplish the capacity allocation and the capacity modification periodically. The packet scheduler may also be arranged to use load information from a base station and/or mobile station of the radio communication system as a base for the capacity allocation and/or capacity modification.

The embodiments of the invention may provide a dynamic packet scheduling wherein the bearer bitrates may be modified during an ongoing packet data call. The embodiments may reduce signalling in the system and load at the controller.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
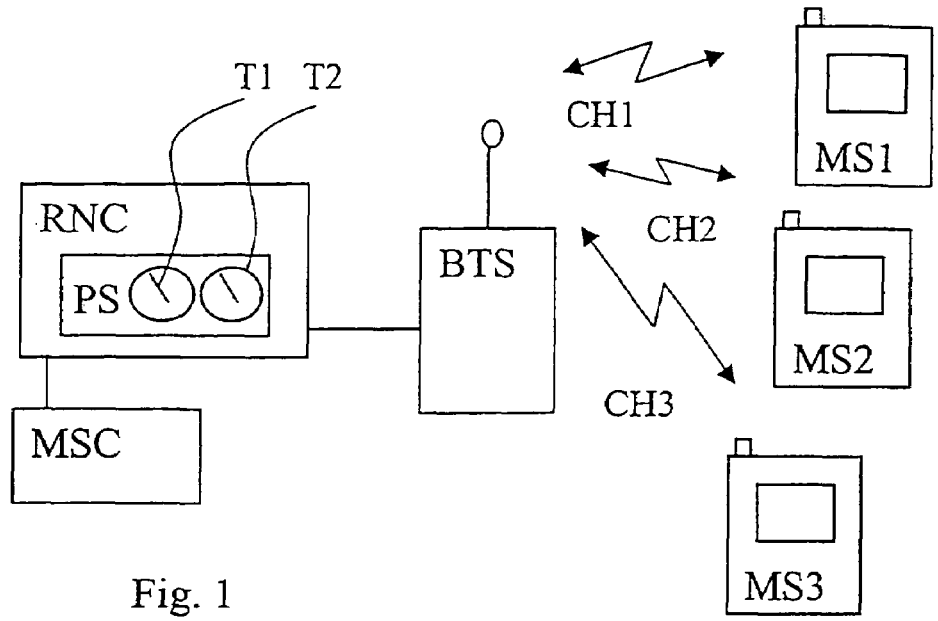
FIG. 1 shows an embodiment of the present invention.

Reference is made to FIG. 1 which is a block diagram illustrating a context in which the present invention may be used. That is, a WCDMA system (Wideband Code Division Multiple Access) mobile communication system that allows a plurality of mobile stations MS1, MS2, MS3 to communicate with a base (transceiver) station BTS in a common cell via respective channels CH1, CH2, CH3. These channels are distinguished from one another by the use of scrambling codes in a manner which is known in the art. Data to be transmitted between the mobile stations (MS) and the base transceiver station (BTS) may be speech data, video data or other data. The data is encoded into a form suitable for transmission at a bit rate which is dependent on the application and the source of the data. It should be appreciated that base stations can sometimes be referred to as node B.

FIG. 1 illustrates also a radio network controller, RNC. The operation of the radio access network controller RNC or similar network element was already briefly discussed above. The controller RNC may be connected further to a mobile switching center MSC and/or other apparatus of a core network of the communications system in a manner known in the art.

FIG. 1 shows further a packet scheduler PS implemented within the radio access network controller RNC. The packet scheduler PS is for scheduling packet data capacity in a manner that will be described below. The function of the packet scheduler PS is to allocate, modify and release bitrates for the packet data users. The bitrate allocation is initiated by a bitrate request that the packet scheduler PS receives from the mobile station MS or the base station BTS. The operation of the packet scheduler PS may be based on parameters such as the requested bitrate, a measured system load, an estimated load change, measured data amount in a mobile station or in a network controller in a MAC (Medium Access Control) layer. The packet scheduler PS may allocate the requested bitrate or alternatively a bitrate that is smaller than the requested rate. The packet scheduler PS may also deny the request, or allocate later the requested bitrate or a bitrate that is smaller than the requested bitrate.

According to an embodiment the packet scheduler PS is cell specific. However, the scheduler PS may also handle more than one cell. The packet scheduler may also handle all the cells of the radio access network controlled by the controller RNC, i.e. the packet scheduler may be common with some of the neighbouring cells or common for all cells in a RNC. It is also noted that the packet scheduler PS may locate in the base station BTS instead of the radio access network controller RNC. The following example assumes that the packet scheduler PS is located in the RNC and is cell specific.

For example, in downlink a MAC (medium access control) layer of a network controller can request the packet scheduler PS to allocate capacity for a certain data bearer. The request may be presented to the packet scheduler PS at any time. The capacity request may either contain a request for a certain bitrate or a request for a certain data amount. Capacity requests (CR) can be sent in the uplink by the mobile station through random channels. In the downlink they may come from the MAC layer. If a dedicated signaling link already exists between the MS and the BTS, it can be used for the request. Other solutions for requesting capacity are also possible.

The packet scheduler PS may have a target power, which it tries to reach. The target may be exceeded, but preferably only occasionally. This target can be given as a total transmitted power in the downlink (PtxTarget) and as a total received power in the uplink (PrxTarget). Ptx_total and Prx_total values are measured by the base station BTS and reported therefrom to the packet scheduler PS at the controller RNC. Based on the received information the packet scheduler PS then knows how much capacity it is allowed to allocate. Initial values for the Ptx_Target and Prx_Target parameters may be definied during network planning. These parameters may be modified later on, should a reason for this arise. The packet scheduling accomplished during the operation of the network may then be based on measurements made in respect of these parameters and power change estimations.

The packet data scheduler PS of FIG. 1 comprises further two separate timers T1 and T2. The function of these will be explained in more detail below.

The packet scheduler PS operates preferably periodically. All capacity requests, which are received within a scheduling period are processed at the same time. When the packet scheduler PS allocates capacity, a DCH is allocated for the bearer with certain peak bit rate for undefined duration and the respective capacity request is removed from the queue of the capacity requests. Bitrate allocation ends when all data is sent.

The packet scheduler PS may comprise separate queues for uplink and downlink capacity requests (CR) between the base station and the mobile stations.

According to a preferred embodiment of the present invention the bitrate allocation and modification are based on two time periods: allocation period and bitrate modification period. These periods can be of equal length or alternatively they may be of different length from each other. If the periods are of different length, the bitrate modification period is then longer than the allocation period. For example, a new allocation period could occur every 100 ms and a new bitrate modification period could occur every 500 ms. It is noted that these periods are given as examples only. The length of the periods will depend on the specific application and may thus vary remarkably from the above.

In each allocation period the packet scheduler PS grants the bitrates for the packet data bearers. The bearer may then use the allocated bitrate for a specified period of time or alternatively the bearer may use the allocated bitrate for a unlimited period of time. If many bearers are requesting capacity at the same time, it may be necessary to make a decision which one of the bearers gets a permission to use the available bitrate.

According to an embodiment, if the packet scheduler PS is not able to allocate capacity for every bearer that is requesting for the capacity, these unscheduled capacity requests may remain in the respective queues. There may be a limit how many scheduling periods (i.e. how long) one capacity request may stay in the queue. This limit may be set e.g. by using RNC configuration parameter 'capacity request queuing time'. When the time limit is exceeded, the capacity request is permanently removed from the queue. New capacity request is then required when an allocation for that bearer is required.

In addition to the allocation, it may be useful that the bearer bitrate can be changed i.e. modified by the packet scheduler PS during a packet switched connection. This is enabled by the procedure referred to as bitrate modification. In each bitrate modification period the packet scheduler PS may modify the already granted bitrates. Modification can be an increase of the bitrate or a decrease of the bitrate. Examples of possible increase and decrease procedures will be discussed later.

There are several reasons why a bitrate modification may be needed. The need to modify bitrates is caused by the unpredictable and bursty nature of the packet data. The modification may be triggered, for example, by a bearer requesting for a higher bitrate or a lower bitrate, by load reasons (too high or too low load) or a need to give more capacity for a higher priority bearer or bearers.

The allocation periods and bitrate modification periods can be synchronous or asynchronous. However, to make the bitrate modifications less bursty and easier to implement inside the RNC, and to avoid excessive capacity requirements, it is preferred to keep the modifications asynchronous. This could be done, for example, in the following manner:

| Time | Operation |
| --- | --- |
| 0 ms | bearer1 is allocated |
| 200 ms | bearer2 is allocated |
| 500 ms | bearer1 is modified (new request is processed 400-500 ms) |
| 700 ms | bearer2 is modified (new request is processed 600-700 ms) |
| 1000 ms and so on | bearer1 may be modified again |

The packet scheduler PS should preferably use such bitrates which have a good Eb/NO (radio signal energy to noise ratio) value. In addition, in the CDMA the granted bitrates should use the CDMA code space in an efficient manner.

The use of different timing periods for allocation and modification may reduce the signalling and load at the RNC. The modification may require more signalling resources and cause more load, and therefore it may be preferred that the allocation is accomplished more often that the modification. If the allocation and modification are always accomplished at the same time (i.e. only one timer period is used), this may result either to a slow allocation process or relatively heavy signalling load.

According to a possibility the modification can be accomplished more often than what is defined by the actual modification period, e.g. when some special conditions are met. For example, if the allowed load is exceeded the bitrates can be decreased even if the modification period has not yet lapsed. Another examples of such triggering conditions include a set-up of an emergency call or a high priority call. In addition, it is possible to have an arrangement where the allocation is periodic but the modification of the bitrates occurs only when a need for modification arises.

Figure 2:
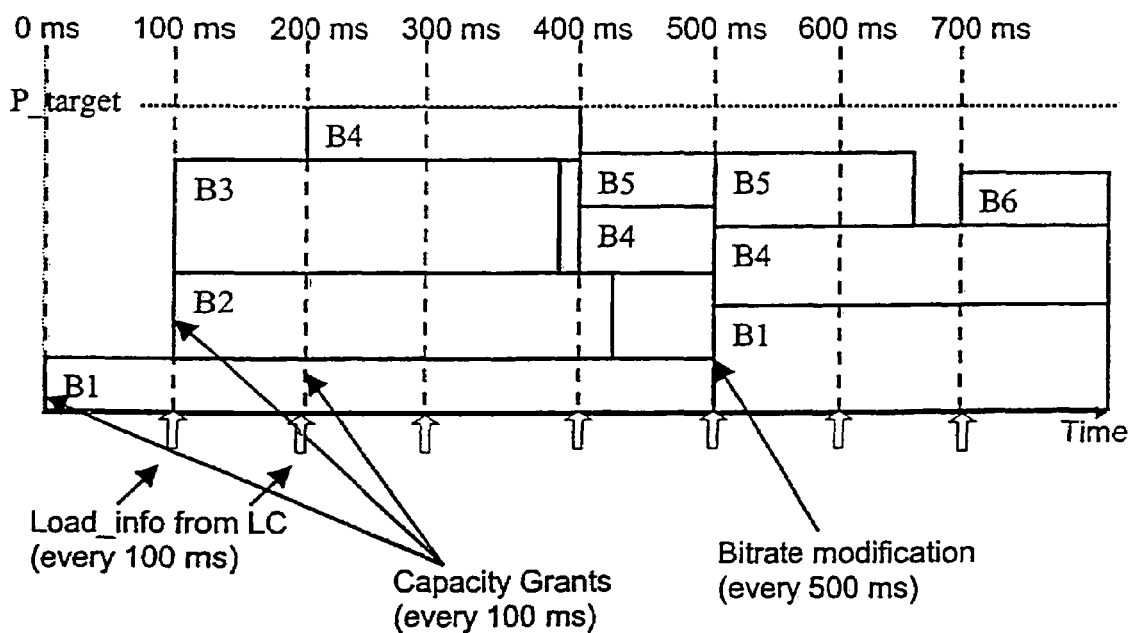
FIG. 2 illustrates a data packet scheduling implementation in accordance with an embodiment of the present invention.

FIG. 2 is an exemplifying illustration of one possible implementation of the invention and illustrates how the packet scheduling may be based on the two different sets of rules for timing, namely on a capacity allocation period and a bitrate modification period. In the illustration the horizontal axis is for the time and the vertical axis is for the capacity. Bearers B1 to B6 i.e. packet data transmitting capacity is shown to be granted every 100 ms.

A bitrate modification operation is shown to be executed every 500 ms. In the example the bitrates of all bearers B1, B4 and B5 that exist at the end of the 500 ms period are modified. However, it may also occur that none of the bearers or only some of the bearers require bitrate modification at this point of time.

The allocation and modification procedures may both be based on base station load information which is provided periodically (e.g. every 100 ms). According to an alternative load information may be received from the mobile station. It is also possible to use load information from the base station and the mobile station.

The embodiment implements a dynamic packet scheduling where the bitrates of bearers can be modified during a call due to load or user specific needs. The dynamic packet scheduler can be used both for uplink and downlink directions.

It is noted that even though FIG. 1 discloses two separate timer entities T1 and T2, the different timing schemes may be implemented by one timer entity arranged to provide the required separate timing schemes for the allocation and modification procedures.

The following will discuss in more detail some possibilities for the bitrate modification function. A bitrate modification function may be used for calculating a bitrate value for each bearer when one or more new capacity requests are received from the bearers. The calculations may be based on specific parameters, as will be discussed below. The possible parameters include parameters such as the requested bitrate, a proposed bitrate, downlink average power of the connection, soft handover (SHO) correction factor, priority order of the bearers and appropriate weighting coefficients.

The capacity of the CDMA is limited. For example, wide area macro network capacity for packet users is less than 200 kbit/s/MHz/Cell. If there are many packet data bearers that want to have capacity, it may not be possible to provide the requested capacity to all users. A procedure for deciding which bearer gets the requested capacity is thus required. In addition, a decision may be required regarding users that receive less capacity than what they actually wanted and users who do not receive any capacity.

When deciding the bearers whose bitrate is either increased or decreased, the decision may be based on various factors and/or parameters. A specific bitrate modification function may also be used when deciding the bearers whose bitrate is either to be increased or decreased. The following will discuss some examples of the parameters on which the decision may be based on:

The bitrate requested by a bearer. This depends on the application, but may also depend on the physical limitations of the particular mobile station MS. The request may be made, for example, by MAC layer in the downlink or a mobile station that is sending a capacity request via RACH in the uplink. If there are many consecutive requests, the latest one is used.

If the bearer is already using some bitrate, this may be taken into account.

Proposed bit rate, i.e. a bitrate proposed for the bearer if bitrates are modified.

Bearer priority as some of the bearers may have higher priority than the others. By setting the priority value, for example, the bearers paying the highest price for the call can be prioritised over the less paying bearers. The prioritisation may also be implemented in a 'hard' way i.e. lower priority bearers are dropped when a higher priority bearer needs capacity.

The average power which a bearer (or the connection where this bearer is mapped) is using. To maximize the capacity, it should be more difficult for high power bearers to be allocated high bitrates than for the low power bearers. In the following equation a downlink average power (Ptx_average) of the connection is used. If there is a multibearer, then the amount of the NRT (Not Real Time: packet data) bearer is calculated by using the bitrates of the bearers.

The possibility whether the bearer is in a soft handover or not. Soft handover bearers are most likely high power bearers and they may also use more base station and RNC resources than a non-soft handover bearers. Thus, it may be useful to reduce the bitrate of bearers in a soft handover state.

SHO_correction factor. This is a correction factor for the bearers, which are in a soft handover state. The arrangement is preferably such that if the value of the SHO factor is higher than 1.0, then the packet scheduler PS discriminates SHO bearers. The value of this parameter could be same than the number of SHO branches. This would reduce the bitrate of the SHO bearers.

a, b, c, d and e exponents. The may be used to emphasize some parameters in the following bitrate modification function. Their values may be '0' or '1', but also some other values could be used.

The bitrate modification function referred to above is a function for determining a bearer which gets a new bitrate, may increase its bitrate or must decrease its bitrate. A possible function for the bitrate modification is:

$$F_{bitrate} = \frac{(\text{Requested\_bitrate})^a * (\text{Priority})^b}{(\text{Proposed\_bitrate})^c * (\text{Ptx\_average})^d * (\text{SHO\_correction\_factor})^e} \quad (1)$$

The parameters that may be used in the function were already discussed above. The bitrate modification function may be used in various manner, the following giving examples of the use thereof in the following two situations: bitrate increase and bitrate decrease.

Bitrate increase is a situation where the cell load is such that new bearers can be admitted or the bitrates of the old bearers can be increased. The packet scheduler may calculate by means of the above equation for the all those bearers, which have not yet received the requested bitrate, what is the $F_{bitrate}$, if their bitrate would be increased by one step (e.g. from 64 kbits to 128 kbits). For a new bearer this would mean minimum bitrate. Next the packet scheduler may select the bearer, which has the highest $F_{bitrate}$ and may ask a power increase estimator to calculate the power, which this change would cause. If this power is too high, the packet scheduler may try what power change the bearer, which has the next highest $F_{bitrate}$ value would cause. If the power value obtained by means of the computations is less than what the packet scheduler could allocate then the packet scheduler assumes that this bitrate modification can be done and does a new calculation for all those bearers which still have not received the bitrate they have requested.

Bitrate decrease is done when cell load has exceeded a predefined target level for the power. In the decrease proceedings some of the allocated bearer bitrates must be decreased or some of the bearers must be dropped from the cell.

The packet scheduler calculates the $F_{bitrate}$ for all of the bearers assuming that their bitrate is decreased by one step. A bearer with the lowest $F_{bitrate}$ value may then be forced to lower its bitrate by this step. If the power is still too high the calculation is done again by assuming the previous change. The bitrate decrease may be followed by bitrate increase, if a relatively high bitrate is decreased leaving some spare capacity for relatively smaller increase.

Some hard limits and/or decision rules may be used in the above calculations, if the change of bitrates causes too many calculation rounds.

By setting different values for the parameters a, b, c, d and e in the equation (1), the rules for the bitrate modification can be easily changed. The following present some examples of the possible options for different decision schemes:
  a=b=d=e=0, c=1: This is so called pure CD (Code Division) mode and could be used in the very first phase in the uplink;
  a=b=d=e=0, c=−1: This is a TD (Time Division) mode i.e. the highest bitrate is increased. Thus, both CD and TD modes can be implemented just by changing the parameters in the bitrate modification function;
  a=b=e=0, c=d=1: This is CD mode for the downlink. In this the average tx-power is also taken into account;
  b=d=e=0, a=c=1: This is kind of a 'democratic' way to share the capacity. Each bearer gets about the same D percentage of the requested bitrate;
  a=d=e=0, b=c=1: This is a pure priority based bitrate modification policy; and
  a=b=0, c=d=e=1: This gives probably the best capacity (in kbit/s/MHz/cell) from the herein proposed basic bitrate modification policies.

In principle, there are two simple approaches for the bit rate allocation. The first is to give low bit rates for the requesting bearers, which makes the DCH allocations longer. The second is to give high bit rates for the requesting bearers, which makes the DCH allocations shorter. The following will discuss a procedure that is kind of a compromise between these two approaches. It is based on so called minimum allowed bit rate. The minimum allowed bit rate parameters can be defined separately to both uplink and downlink directions. 'Uplink minimum allowed bit rate' and 'downlink minimum allowed bit rate' may be cell specific configuration parameters. They define the minimum peak bit rate that can be allocated to the requesting bearer in the uplink and the downlink.

Figure 3:
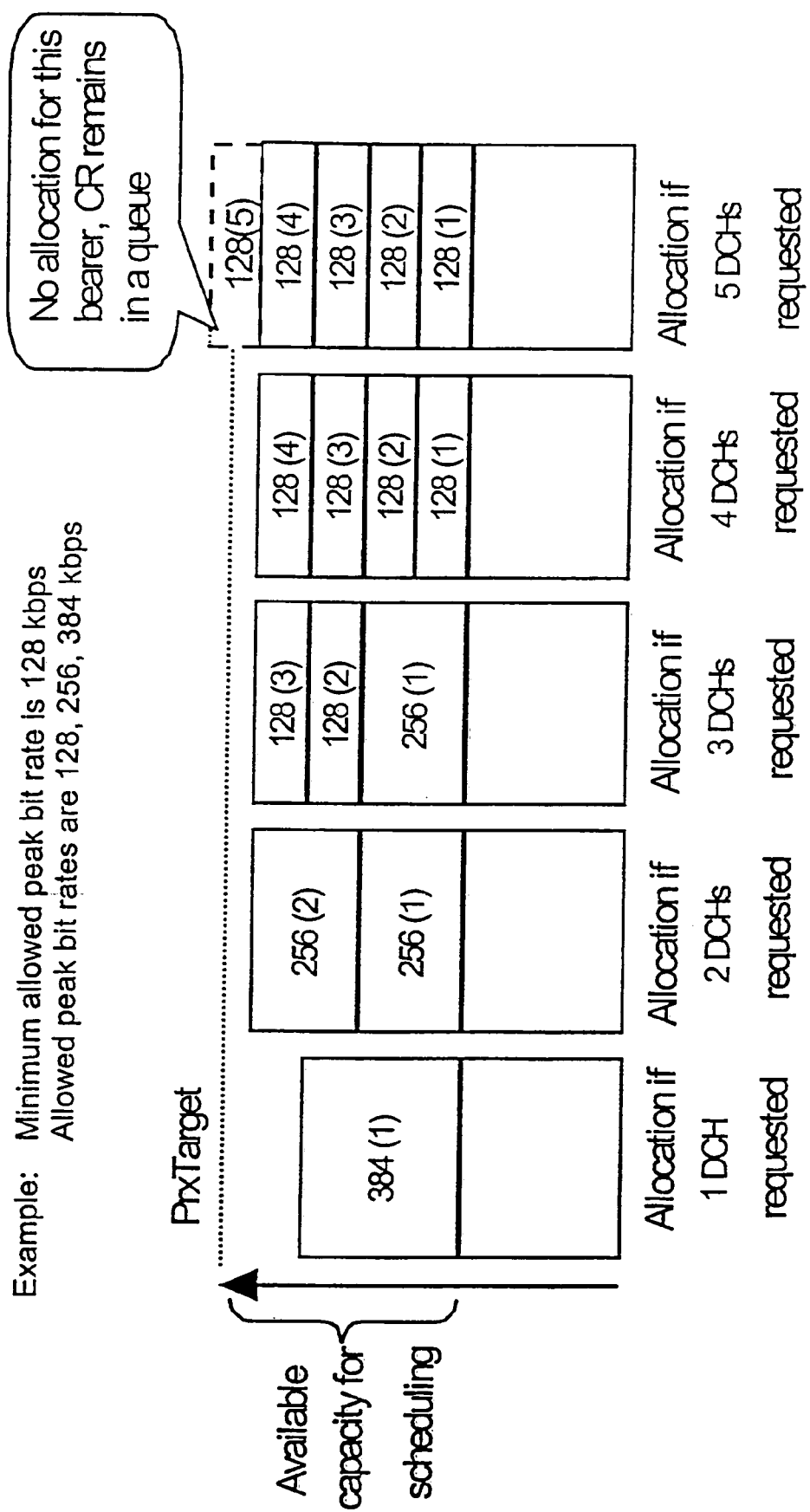
FIG. 3 shows an example of bitrate allocation.

FIG. 3 shows an example of the proposed bit rate allocation method with minimum allowed peak rate of 128 kbits and allowed bitrates of 128, 256 and 384 kbits. In the example, if there is five capacity requests, the fifth request gets no, allocation even if there is space, for example, for a 64 kbps connection. Instead, it is assumed that the fifth capacity request within this scheduling period gets an allocation during the next scheduling period.

Figure 4:
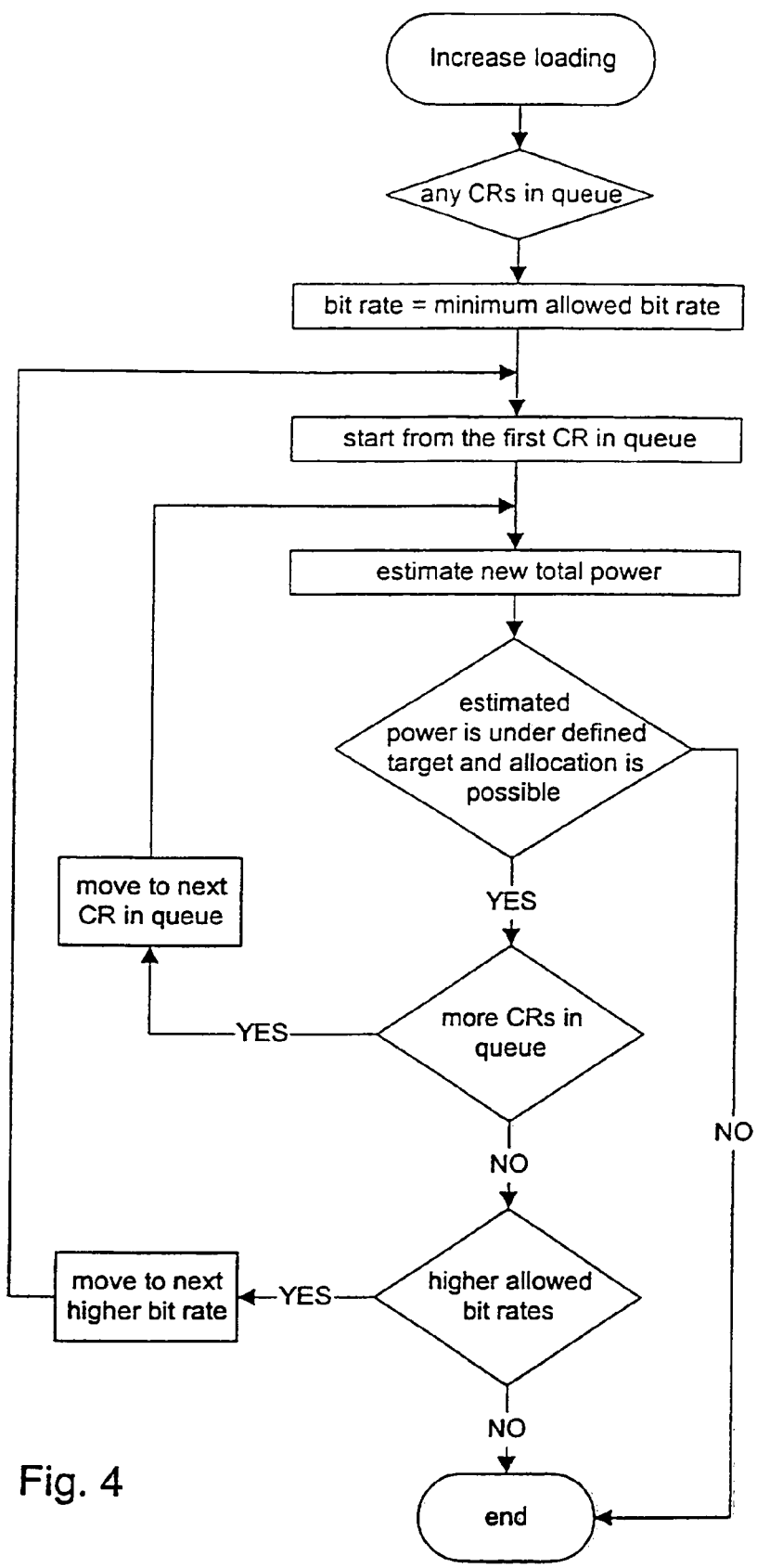
FIG. 4 is a flowchart illustrating the operation of an embodiment of the present invention.
Figure 5A:
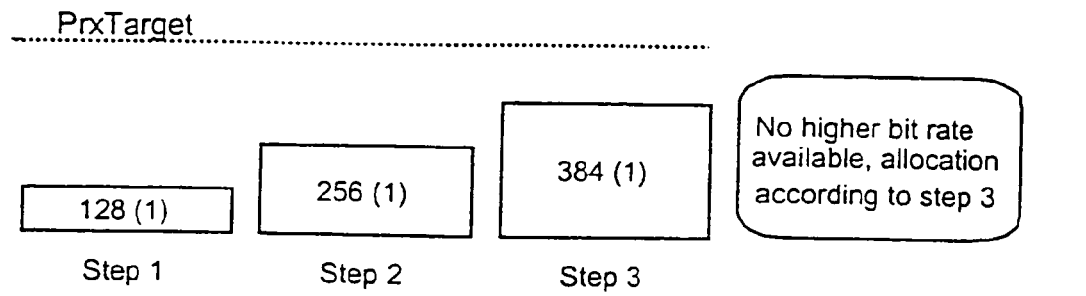
FIGS. 5a to 5e illustrate possible allocation procedures in a load increase situation in accordance with the FIG. 4 flowchart.
Figure 5B:
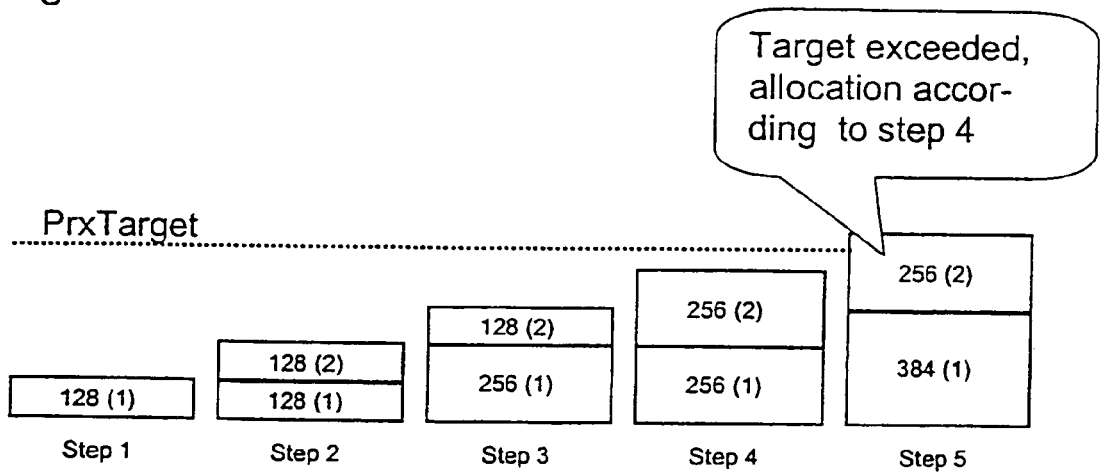
Figure 5C:
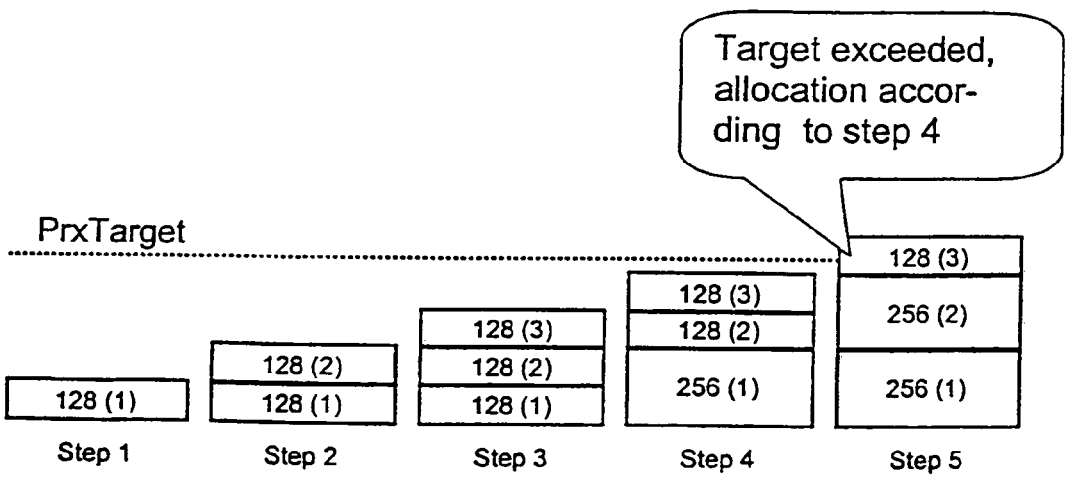
Figure 5D:
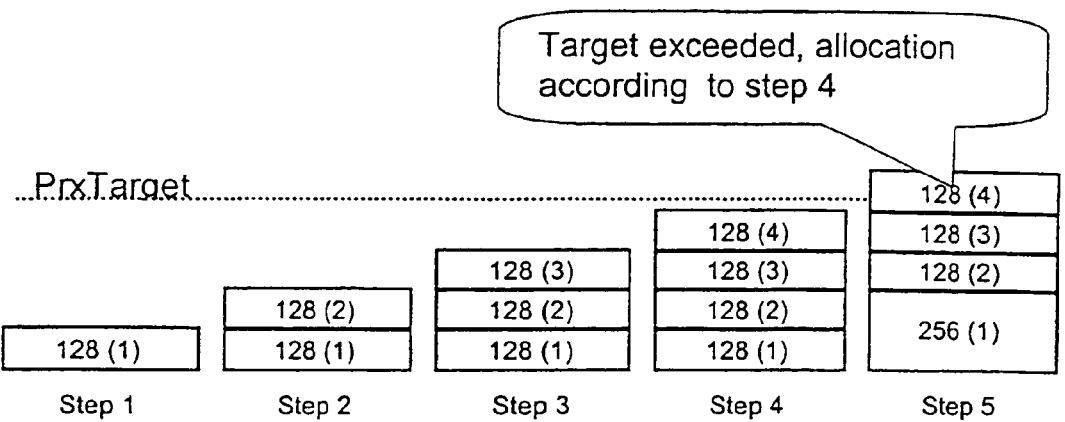
Figure 5E:
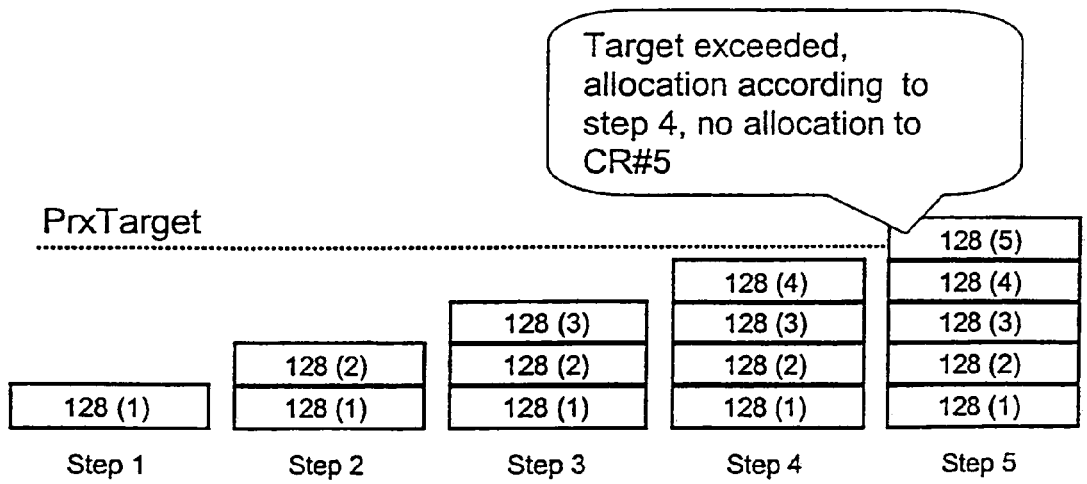

FIG. 4 shows a bit rate allocation algorithm in the event of an increasing load. Examples of the operation of the algorithm for different number of queuing capacity requests are shown in FIGS. 5a to 5e. FIG. 5a shows a situation where there is only one queuing request, FIG. 5b shows two queuing requests, FIG. 5c shows three queuing requests, FIG. 5d shows four queuing requests and FIG. 5e shows five queuing requests.

If the load is too high and the planned target power level Prxtarget is exceeded by certain offset, the packet scheduler starts to decrease the DCH bit rates of the packet data bearers. In accordance with a preferred arrangement the bit rates can not be decreased lower than the minimum allowed bit rate.

The selection of the bearers, whose bit rates has to be decreased, may be done randomly. There may also be several bearer classes with different priorities or some other selection rules, which are taken into account, as discussed above. The following example assumes that two bearer classes are in use. The load decrease may then be performed in a following order:
1. DCH bit rates of the lower priority class bearers are decreased in random order,
2. DCH bit rates of the higher priority class bearers are decreased in random order,
3. Lower priority class bearers are switched from DCH to CCH in random order,
4. Higher priority class bearers are switched from DCH to CCH in random order.

Figure 6:
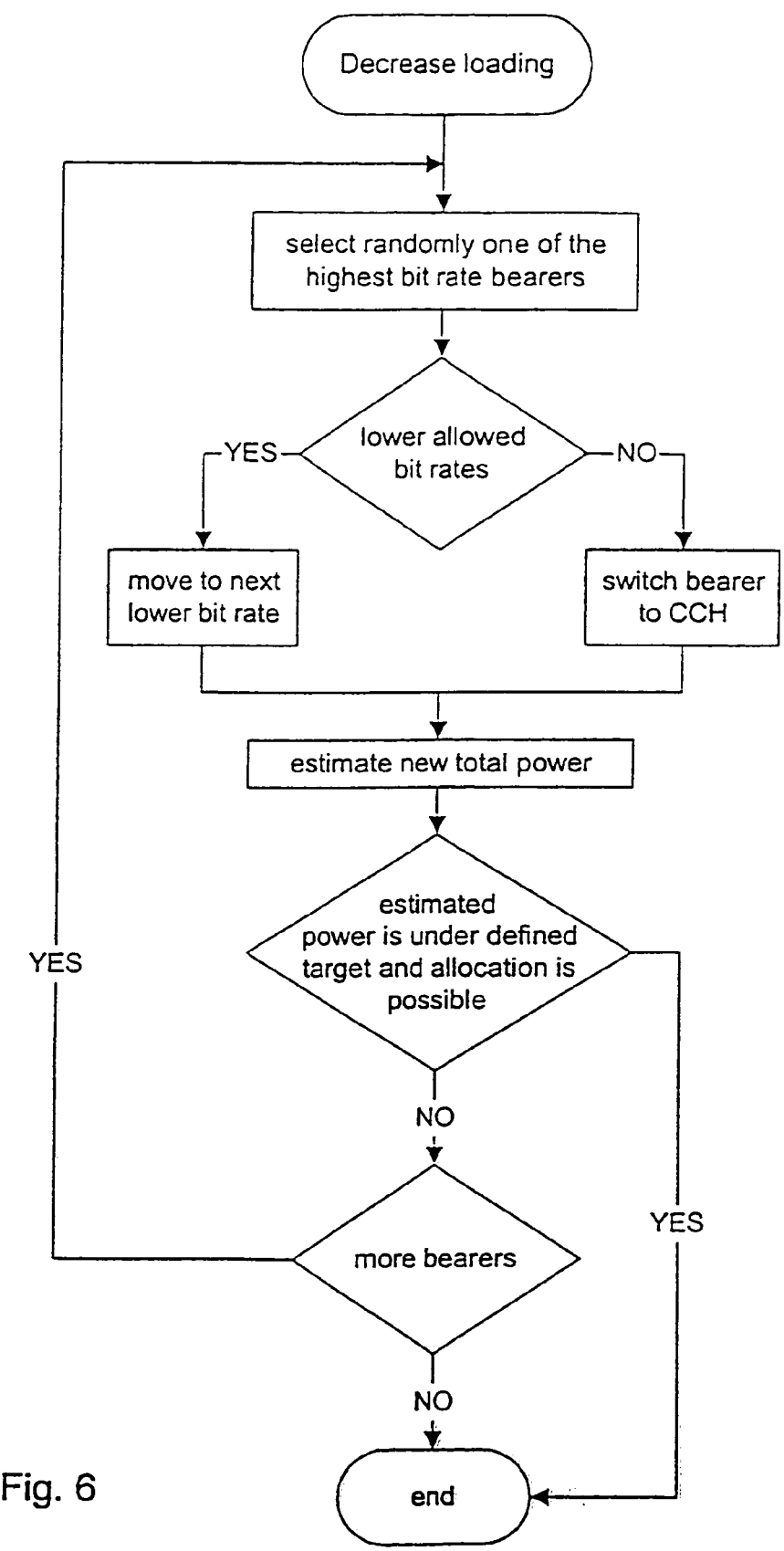
FIG. 6 is a flowchart illustrating the operation of another embodiment of the present invention.
Figure 7A:
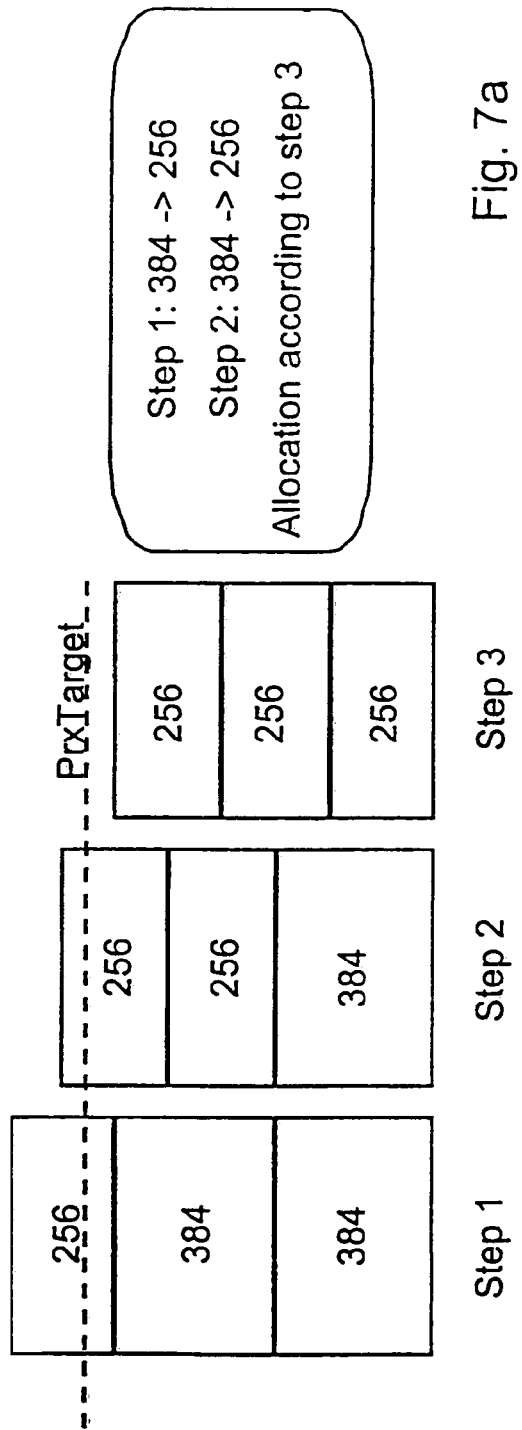
FIGS. 7a and 7b illustrate possible allocation procedures in a load decrease situation in accordance with the FIG. 6 flowchart.
Figure 7B:
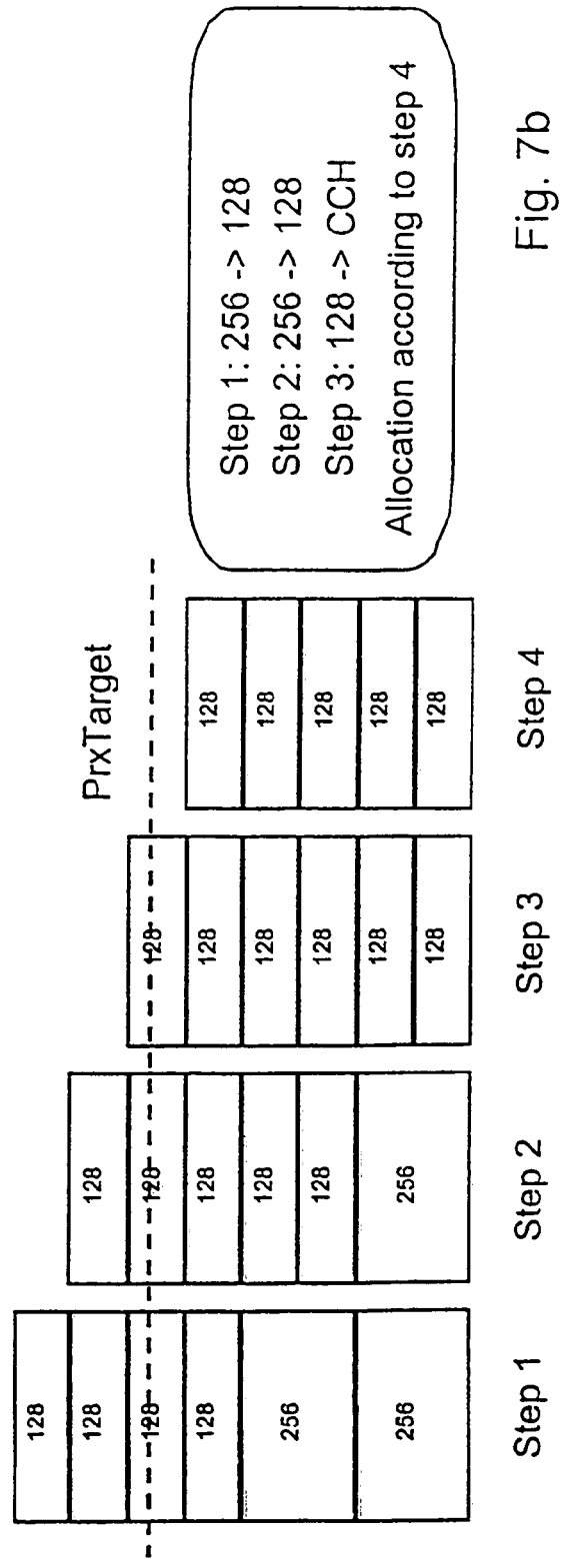

A possible load decrease algorithm is presented in FIG. 6. Examples of its operation are shown in FIGS. 7a and 7b, wherein FIG. 7a shows a DCH modification and FIG. 7b shows a DCH modification and release.

The above embodiments implement a bit rate allocation method for packet data in a radio telecommunications system, such as in the WCDMA. The embodiments may be based on minimum allowed bit rate concept, which offers reasonable high bit rate to every requesting bearer. The embodiments may eliminate the possibility of such bearers which are hanging long times with low bit rate DCH allocations. The embodiments may add flexibility to the system because the minimum allowed bit rate is configurable according to the operator's demands. It is possible to configure the algorithm so that it allocates only very high bit rates or wide range of bit rates including low bit rates.

The embodiment of the present invention has been described in the context of a WCDMA system. This invention is also applicable to any other radio access techniques including code division multiple access, frequency division multiple access or time division multiple access as well as any hybrids thereof.

It is also noted herein that while the above describes exemplifying embodiments of the invention, there are several variations and modifications which may be made to the disclosed solution without departing from the scope of the present invention as defined in the appended claims:

The invention claimed is:

1. A method in a radio communication system providing packet data services, comprising:
receiving a request for a packet data bearer at a packet data scheduler apparatus;
allocating capacity for the packet data bearer based on a first timing scheme using a first timing entity; and
modifying the allocated capacity based on a second timing scheme using the first timing entity or a second timing entity, wherein the allocating capacity for the packet data bearer and the modifying the allocated capacity are based on two time periods, an allocation period and a bitrate modification period respectively, and are repeated periodically in accordance with the respective timing schemes,
wherein at least one of the capacity allocation or capacity modification are based on load information from at least one of a base station or a mobile station of the radio communication system, and
wherein an additional modification step is accomplished between periodical modifications defined by said second timing scheme, if a triggering condition is satisfied.

2. A method as claimed in claim 1, wherein the first timing scheme defines a time period that is of different length than the time period defined by the second timing scheme.

3. A method as claimed in claim 2, wherein the time period defined by the first timing scheme is shorter than the time period defined by the second timing scheme.

4. A method as claimed in claim 1, wherein the first timing scheme and the second timing scheme define a time period that is of equal length.

5. A method as claimed in claim 1, wherein the first and second timing schemes are asynchronous.

6. A method as claimed in claim 1, wherein the first and second timing schemes are synchronous.

7. A method as claimed in claim 1, wherein the information is based on a total received power in an uplink direction.

8. A method as claimed in claim 1, wherein the information is based on a total transmitted power in a downlink direction.

9. A method as claimed in claim 1, wherein the capacity allocation and/or capacity modification is based on at least one target value for the power levels experienced by said base station of the radio communication system.

10. A method as claimed in claim 1, wherein a decision is made whether all that capacity that was requested is allocated, a smaller amount of capacity than what was requested is allocated or no capacity is allocated.

11. A method as claimed in claim 1, wherein capacity requests are set in at least one queue.

12. A method as claimed in claim 11, wherein the queuing time of a capacity request is limited.

13. A method as claimed in claim 1, wherein the modifying of the allocated capacity comprises either an increase of the bitrate of a packet data bearer or a decrease of the bitrate of a packet data bearer.

14. A method as claimed in claim 1, wherein bitrates having relatively good signal energy to noise ratio values are selected.

15. A method as claimed in claim 1, wherein an additional modification step is accomplished between periodical modifications defined by the second timing scheme.

16. A method as claimed in claim 1, wherein a bitrate modification function is used for calculating a bitrate value for a data packet bearer after one or more new capacity requests are received.

17. A method as claimed in claim 16, wherein the calculations are based on one or several of the following: the requested bitrate; the bitrate used by the packet data bearer; a proposed bitrate; average power used by the packet data bearer; soft handover correction factor; priority order of packet data bearers; and a weighting coefficient.

18. A method as claimed in claim 16, wherein an estimate is computed for the packet data bearer that is the new load that would be caused if the bitrate of the packet data bearer is changed by a proposed amount.

19. A method as claimed in claim 18, wherein the estimate is calculated for all packet data bearers, and the packet data bearer whose bitrate is to be changed is selected by comparing the calculated estimates.

20. A method as claimed in claim 1, comprising a step of changing the rules of the capacity modification.

21. A method as claimed in claim 20, wherein the capacity modification is based on a capacity modification function, and wherein the rules are changed by changing the values of one or several of the parameters of the function.

22. A radio communication system providing packet data services, comprising:
a packet data scheduler, said scheduler being arranged to allocate capacity for at least a packet data bearer and to modify the allocated capacity;
a first timer for timing the allocation of capacity for the packet data bearers; and
a second timer for timing the modification of the allocated capacity, wherein the packet data scheduler is arranged to accomplish the capacity allocation and the capacity modification periodically based on two time periods, an allocation period and a bitrate modification period respectively,
wherein said allocation period and said bitrate modification period occur at regular respective intervals, and
wherein an additional modification step is accomplished between periodical modifications defined by a second timing scheme, if a triggering condition is satisfied.

23. A radio communication system as claimed in claim 22, wherein the packet scheduler is arranged to use load information from at least one of a base station or mobile station of the radio communication system as a base for the capacity allocation and/or capacity modification.

24. A packet data scheduler for a radio communication system, comprising:
an interface configured to receive a request for a packet data bearer;
a first timer for timing an allocation of capacity for at least said packet data bearer; and
a second timer for timing a modification of the allocated capacity, wherein the packet data scheduler is arranged to accomplish the capacity allocation and the capacity modification periodically based on two time periods, an allocation period and a bitrate modification period respectively,
wherein said allocation period and said bitrate modification period occur at regular respective intervals, and
wherein an additional modification step is accomplished between periodical modifications defined by a second timing scheme, if a triggering condition is satisfied.

25. A radio communication system providing packet data services, comprising:
means for receiving a request for a packet data bearer;
means for allocating capacity for at least said packet data bearer and for modifying the allocated capacity;

means for timing the allocation of capacity for the packet data bearers; and means for timing the modification of the allocated capacity, wherein the means for allocating accomplishes capacity allocation and the capacity modification periodically based on two time periods, an allocation period and a bitrate modification period respectively, wherein said allocation period and said bitrate modification period occur at regular respective intervals, and wherein an additional modification step is accomplished between periodical modifications defined by a second timing scheme, if a triggering condition is satisfied.

* * * * *

UNITED STATES PATENT AND TRADEMARK OFFICE
CERTIFICATE OF CORRECTION

| | | |
|---|---|---|
| PATENT NO. | : 7,626,989 B2 | Page 1 of 1 |
| APPLICATION NO. | : 10/204196 | |
| DATED | : December 1, 2009 | |
| INVENTOR(S) | : Raitola et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1670 days.

Signed and Sealed this

Twenty-first Day of December, 2010

David J. Kappos
*Director of the United States Patent and Trademark Office*